United States Patent [19]

Kato

[11] Patent Number: 5,223,089
[45] Date of Patent: Jun. 29, 1993

[54] METHOD OF DEINKING WASTE PAPER USING A FATTY ACID POLYOXYALKYLENE ESTER

[75] Inventor: Yasuo Kato, Hyogo, Japan

[73] Assignee: Nissin Kagaku Kenkyusho Co., Ltd., Ehime, Japan

[21] Appl. No.: 847,366

[22] Filed: Mar. 4, 1992

[30] Foreign Application Priority Data

Mar. 4, 1991 [JP] Japan .................................. 3-037581

[51] Int. Cl.$^5$ ................................................. D21C 5/02
[52] U.S. Cl. ......................................................... 162/5
[58] Field of Search ............................................. 162/5

[56] References Cited

FOREIGN PATENT DOCUMENTS

| | | | |
|---|---|---|---|
| 2243892 | 10/1987 | Japan | 162/5 |
| 2276093 | 11/1987 | Japan | 162/5 |
| 62-61711 | 12/1987 | Japan . | |
| 182489 | 7/1988 | Japan . | |
| 3165591 | 7/1988 | Japan | 162/5 |
| 64-11756 | 2/1989 | Japan . | |

Primary Examiner—Karen M. Hastings
Attorney, Agent, or Firm—Wenderoth, Lind & Ponack

[57] ABSTRACT

A method of deinking waste paper for reclamation thereof, which comprises disintegrating waste paper with an alkali in water in the presence of a fatty acid polyoxyalkylene ester having the formula $$R-COO(PO)_x(AO)_y(PO)_z-H$$

wherein R is an alkyl or alkenyl of 7–21 carbons, PO is an oxypropylene group, AO is an oxyethylene group, or a mixed oxyalkylene group composed of an oxyethylene group and at least one oxyalkylene group selected from the group consisting of an oxypropylene group and an oxybutylene group, and x is a numeral of 1–20, y is a numeral of 1–50, and z is a numeral of 1–50, as a deinking agent.

7 Claims, No Drawings

METHOD OF DEINKING WASTE PAPER USING A FATTY ACID POLYOXYALKYLENE ESTER

FIELD OF THE INVENTION

This invention relates to a method of deinking waste paper for reclamation thereof. More particularly, the invention relates to a method of deinking waste paper such as newspapers or magazines using a specific fatty acid polyoxyalkylene ester as a deinking agent in the known floatation method to provide deinked pulp having a high degree of whiteness and low residual ink droplet number.

DESCRIPTION OF THE PRIOR ART

Waste paper such as newspapers or magazines have been reclaimed by disintegrating the waste paper to pulp fibers and then removing printing ink components such as carbons or vehicles from the pulp fibers to recover the pulp fibers for reuse as paper making material. The reclamation of waste paper becomes more important on account of shortage of wood resources and rise in their prices, and there is a strong demand for a higher performance deinking agent since it becomes more difficult to deink the recent waste paper on account of changes in the printing techniques, printing systems and printing ink compositions.

The floation method has been known as a representative of the deinking methods of waste paper for its reclamation. According to the floation method, the waste paper is disintegrated with an alkali in water to provide an aqueous slurry of pulp fibers, a deinking agent is added thereto to remove the ink components from the waste paper and allow the ink compositions to coagulate, blowing the air into the slurry so that it foams and the ink compositions adhere to the foam, and then the foam is removed from the slurry together with the ink compositions to leave deinked pulp fibers. The resultant pulp fibers are bleached for reuse as paper making material.

A variety of surfactants have been used as a deinking agent in the floation method, and a higher fatty acid soap such as stearic acid soap is a representative. The higher fatty acid soap has a high performance for removing ink compositions from waste paper. However, the higher fatty acid soap is not sufficiently foamable so that the coagulated and floated ink compositions are incompletely removed, and thus the recovered pulp fibers have still a many number of ink spots therein. There is also a tendency that the released ink compositions deposit on the deinking device used. Moreover, it is necessary to use the higher fatty acid soap in a large amount to obtain intended deinking results, and accordingly the deinking cost is high.

In order to solve these problems, there have been recently proposed a number of deinking agents other than the higher fatty acid soap, among which are anionic surfactants such as sodium alkylbenzenesulfonates, higher alcohol sulfate salts, alpha-olefin sulfonates or dialkyl sulfosuccinates; or nonionic surfactants such as higher alcohols, alkylphenols, ethylene oxide and/or propylene adducts to higher alcohols or alkylphenols. Very recently, there have been proposed a deinking agent containing alkylene oxide adducts to higher fatty acids which is featured by the presence of a carboxyl group residual bonded to a polyoxyalkylene group, as disclosed in Japanese Patent Publication No. 61711/1987, Japanese Patent Application Laid-open No. 182489/1988 and Japanese Patent Publication No. 11756/1989 among others.

The above mentioned agents are improved in many respects compared with the higher fatty acid soap, however, the ink removal performance when used in the floation method is not satisfactory.

BRIEF SUMMARY OF THE INVENTION

It is, therefore, an object of the invention to provide a method of deinking waste paper such as newspapers or magazines using a specific deinking agent in the known floatation method to provide deinked pulp having a high degree of whiteness and low residual ink droplet number.

The invention provides a method of deinking waste paper for reclamation thereof, which comprises disintegrating waste paper with an alkali in water in the presence of a fatty acid polyoxyalkylene ester having the formula

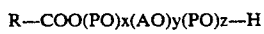

R—COO(PO)x(AO)y(PO)z—H wherein R is an alkyl or alkenyl of 7-21 carbons, PO is an oxypropylene group, AO is an oxyethylene group, or a mixed oxyalkylene group composed of an oxyethylene group and at least one oxyalkylene group selected from the group consisting of an oxypropylene group and an oxybutylene group, and x is a numeral of 1-20, y is a numeral of 1-50, and z is a numeral of 1-50, as a deinking agent.

DETAILED DESCRIPTION

The above fatty acid polyoxyalkylene ester used in the invention as a deinking agent is structurally featured by that it has oxypropylene groups bonded to the carboxyl group residual of the fatty acid and propylene glycol residual at the end of the molecule.

Since the deinking agent used in the method of the invention contains the above fatty acid polyoxyalkylene ester as a deinking agent which is well-balanced in dispersibility and coagulating ability of ink compositions, and thus the use of the deinking agent according to the invention in the floatation method provides deinked pulp having a high degree of whiteness and low residual ink droplet number.

The fatty acid polyoxyalkylene ester having an average molecular weight preferably of 800-8000, more preferably 1000-2000, most preferably 1700-2000, is preferred since such an ester has especially eminent deinking effects.

A further feature of the fatty acid polyoxyalkylene ester is that it is liquid at normal temperatures, and can be added as it is to a disintegrator when waste paper is disintegrated in water so that the energy cost for deinking treatment is greatly reduced.

The fatty acid polyoxyalkylene ester may be produced by a known method in which, as fatty acid components, there may be used, for example, caprylic acid, capric acid, lauric acid, oleic acid, myristic acid, palmitic acid or stearic acid. These fatty acids may be used singly or as a mixture. In particular, stearic acid, palmitic acid or oleic acid is preferred on account of high deinking performance.

In the above formula, AO is an oxyethylene group, or a mixed oxyalkylene group composed of an oxyethylene group and at least one oxyalkylene group selected from the group consisting of an oxypropylene group and an oxybutylene group. Thus, the AO may be an oxyethylene group, oxyethylene/oxypropylene group, oxyethylene/oxybutylene group, oxyethylene/oxypropylene/oxybutylene group or an oxybutylene group. These oxyalkylene groups may be in the form of random copolymers or block copolymers.

According to the method of the invention, the fatty acid polyoxyalkylene ester is used in the stage of disintegrating waste paper in water with an alkali such as sodium hydroxide usually in an amount of 0.2–1.0% by weight based on the waste paper, although not limited to the exemplified.

The method of the invention has an important feature in that the deinking agent can be used as a one component agent. However, the agent may be used in conjunction with any known deinking agent such as anionic surfactants or nonionic surfactants, for example, a higher alcohol, a higher alcohol sulfate salt, a sulfate salt of ethylene oxide adducts to higher alcohols or alkylphenols.

As above set forth, the method of the invention uses such a specific fatty acid polyoxyalkylene ester as a deinking agent in the floatation method for waste paper reclamation, and thus the method provides deinked pulp having a high degree of whiteness and low residual ink droplet number. In addition, the deinking agent used is a one component liquid agent so that it can be used easily and reduces the energy required in the floatation method in the deinking process.

The invention will be described in more detail with reference to examples, however, the invention is not limited to the examples.

EXAMPLES

Eighty percent by weight of waste newspapers (offset/relief ratio: 6/4) and 20% by weight of waste leaflets were cut into pieces and placed in a bench disintegrator (JIS P-8209), to which were then added 1.5% by weight of sodium hydroxide, 3.5% by weight of No. 3 sodium silicate, 1.0% by weight of a 30% aqueous solution of hydrogen peroxide and 0.3% by weight of a deinking agent indicated in Table 1, each based on the weight of the waste paper, and then warm water so that the resultant aqueous slurry contained the waste paper in an amount of 10% by weight. The waste paper was then disintegrated at 55° C. for 20 minutes. The resultant pulp slurry was diluted to a pulp concentration of 1% by weight, and then the floatation treatment was carried out at 30° C. for 10 minutes with the use of a testing floatator.

The resultant pulp slurry was formed into a sheet having a weight of 150 g/m² using a standard type sheeting machine (JIS P-8209). The whiteness of the sheet was measured with a Hunter whiteness meter according to JIS P-8123. The residual ink droplet number was measured with an image analyzer ($\times 100$). The results are summarized in Table 1.

TABLE 1

| Deinking Agent | Whiteness (%) | Residual Ink Droplet Number | Average Molecular Weight |
|---|---|---|---|
| Examples | | | |
| 1 $C_{15}H_{31}COO(PO)_7(EO)_{15}(PO)_5(EO)_{15}(PO)_7H$ | 55.8 | 12 | 2678 |
| 2 $C_{15}H_{31}COO(PO)_5[(EO)_{25}(EO)_5](PO)_5H$ | 55.2 | 11 | 2296 |
| 3 $C_{17}H_{35}COO(PO)_{10}(EO)_{30}(PO)_{10}H$ | 56.6 | 14 | 2764 |
| 4 $C_{17}H_{35}COO(PO)_{10}[(EO)_{30}(PO)_5](PO)_5H$ | 56.3 | 11 | 2764 |
| 5 $C_{17}H_{33}COO(PO)_6(EO)_{40}(PO)_5H$ | 56.0 | 13 | 2506 |
| 6 $C_{17}H_{33}COO(PO)_{10}[(EO)_{30}(PO)_5](PO)_{20}H$ | 55.8 | 15 | 3632 |
| 7 $C_{17}H_{35}COO(PO)_7(EO)_{25}(PO)_6H$ | 57.3 | 8 | 1964 |
| 8 $C_{17}H_{35}COO(PO)_5(EO)_{15}(PO)_{12}H$ | 57.6 | 7 | 1930 |
| 9 $C_{15}H_{31}COO(PO)_{10}(EO)_{14}(PO)_{10}H$ | 57.4 | 7 | 1956 |
| 10 $C_{15}H_{31}COO(PO)_3(EO)_{10}(PO)_{15}H$ | 57.1 | 6 | 1740 |
| 11 $C_{15}H_{31}COO(PO)_{10}(EO)_5(PO)_{15}H$ | 58.0 | 6 | 1926 |
| Comparative Examples | | | |
| 1 $C_{17}H_{35}COO(EO)_5(PO)_{10}(EO)_{20}H$ | 50.1 | 39 | 1964 |
| 2 $C_{17}H_{33}COO(EO)_{20}(PO)_{10}H$ | 51.7 | 37 | 1742 |
| 3 $C_{15}H_{31}COO(EO)_{15}H$ | 50.3 | 33 | 916 |
| 4 $C_{15}H_{31}COO(PO)_2H$ | 50.2 | 40 | 372 |
| 5 $C_{17}H_{35}COO(PO)_{20}(EO)_{250}(PO)_{20}H$ | 50.3 | 42 | 13604 |
| 6 $C_{15}H_{31}COO(PO)_{20}(EO)_{270}(PO)_{20}H$ | 50.0 | 38 | 14456 |
| 7 $C_{17}H_{35}COO[(EO)_6(PO)_{15}]H$ | 51.1 | 35 | 1418 |

NOTES: Oxyalkylenes in the brackets are in the form of random copolymers.

As seen in Table 1, the method of the invention provides deinked pulp having a higher degree of whiteness and lower residual ink droplet number than a method wherein a fatty acid polyoxyalylene ester which has oxyethylene groups bonded to the carboxyl residual of fatty acid is used as a deinking agent, and even than a method wherein a fatty acid polyoxyalylene ester which has oxypropylene groups bonded to the carboxyl residual of fatty acid, but has no such a structure as contains the AO group between the oxypropylene groups bonded to the carboxyl residual of fatty acid and the oxypropylene group at the end of the molecule.

It is also understood that the use of fatty acid polyoxyalylene ester which has an average molecular weight of 1000–2000 provides the best results.

What is claimed is:

1. A method of deinking waste paper for reclamation thereof, which comprises disintegrating waste paper with an alkali in water in the presence of a fatty acid polyoxyalkylene ester having the formula

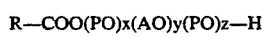

R—COO(PO)x(AO)y(PO)z—H wherein R is an alkyl or alkenyl of 7-21 carbons, PO is an oxypropylene group, AO is an oxyethylene group, or a mixed oxyalkylene group composed of an oxyethylene group and at least one oxyalkylene group selected from the group consisting of an oxypropylene group and an oxybutylene group, and x is a numeral of 1-20, y is a numeral of 1-50, and z is a numeral of 1-50, in an amount effective as a deinking agent.

2. The method as claimed in claim 1 wherein the fatty acid polyoxyalkylene ester has the formula $$\text{R—COO(PO)}_x\text{(AO)}_y\text{(PO)}_z\text{—H}$$

wherein R is an alkyl or alkenyl of 7-21 carbons, PO is an oxypropylene group, AO is an oxyethylene group, or a mixed oxyalkylene group composed of an oxyethylene group and at least one oxyalkylene group selected from the group consisting of an oxypropylene group and an oxybutylene group, and x is a numeral of 3-15, y is a numeral of 20-40, and z is a numeral of 5-20.

3. The method as claimed in claim 1 wherein the fatty acid polyoxyalkylene ester has a molecular weight of 300-8000.

4. The method as claimed in claim 1 wherein the fatty acid polyoxyalkylene ester has a molecular weight of 1000-2000.

5. The method as claimed in claim 1 wherein the fatty acid polyoxyalkylene ester has a molecular weight of 1700-2000.

6. The method as claimed in claim 1 wherein the fatty acid polyoxyalkylene ester is used in an amount of 0.2-1.0% by weight based on the waste paper.

7. The method as claimed in claim 1 wherein the fatty acid residual in the formula is the fatty acid residual of caprylic acid, capric acid, lauric acid, oleic acid, myristic acid, palmitic acid, stearic acid, or a mixture of these.

* * * * *